(12) United States Patent
DeLeon et al.

(10) Patent No.: US 12,354,282 B2
(45) Date of Patent: ***Jul. 8, 2025

(54) GOLF BALL TRACKING SYSTEM AND METHODS

(71) Applicant: Full-Swing Golf, Inc., Carlsbad, CA (US)

(72) Inventors: John DeLeon, Carlsbad, CA (US); Daniel Weitzner, Concord (CA); Zachary Carofanello, Rochester, NY (US)

(73) Assignee: Full-Swing Golf, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,725

(22) Filed: Jan. 10, 2024

(65) Prior Publication Data

US 2024/0144486 A1 May 2, 2024

Related U.S. Application Data

(63) Continuation of application No. 17/208,860, filed on Mar. 22, 2021, now Pat. No. 11,875,517.

(60) Provisional application No. 62/993,344, filed on Mar. 23, 2020.

(51) Int. Cl.
*G06T 7/246* (2017.01)
*G06T 7/80* (2017.01)

(52) U.S. Cl.
CPC ............... *G06T 7/246* (2017.01); *G06T 7/80* (2017.01); *G06T 2207/10032* (2013.01); *G06T 2207/30204* (2013.01); *G06T 2207/30224* (2013.01); *G06T 2207/30241* (2013.01)

(58) Field of Classification Search
CPC . G06T 7/246; G06T 7/80; G06T 2207/10032; G06T 2207/30204; G06T 2207/30224; G06T 2207/30241
See application file for complete search history.

(56) References Cited

U.S. PATENT DOCUMENTS

| 8,348,276 | B2* | 1/2013 | Brennan | H04N 23/20 |
| | | | | 273/317.4 |
| 9,339,715 | B2* | 5/2016 | Luciano, Jr. | G01S 13/751 |
| 9,649,545 | B2* | 5/2017 | Dawe | A63B 71/06 |
| 10,380,409 | B2* | 8/2019 | Thornbrue | G06V 20/647 |
| 10,596,416 | B2* | 3/2020 | Forsgren | G01S 13/587 |
| 11,335,013 | B2* | 5/2022 | Forsgren | G06T 7/11 |
| 11,875,517 | B2* | 1/2024 | DeLeon | G06T 7/80 |
| 2008/0146302 | A1* | 6/2008 | Olsen | A63F 13/828 |
| | | | | 463/7 |
| 2008/0199043 | A1* | 8/2008 | Forsgren | G06T 7/194 |
| | | | | 382/103 |

(Continued)

*Primary Examiner* — Molly Wilburn
(74) *Attorney, Agent, or Firm* — Veros Legal Solutions, LLP

(57) ABSTRACT

A golf ball tracking system identifies a first pixel at which a golf ball is located in a first image frame and a second pixel at which the golf ball is located in a second image frame. The system may determine that the first pixel represents a location where the golf ball impacts the golf surface based at least in part on a difference in location between the first pixel in the first image frame and the second pixel in the second image frame.

18 Claims, 11 Drawing Sheets
(2 of 11 Drawing Sheet(s) Filed in Color)

(56) References Cited

U.S. PATENT DOCUMENTS

| | | | |
|---|---|---|---|
| 2009/0017919 A1* | 1/2009 | Brennan | A63B 24/0003 |
| | | | 463/47 |
| 2016/0074735 A1* | 3/2016 | Dawe | A63B 71/06 |
| | | | 463/3 |
| 2017/0161561 A1* | 6/2017 | Marty | H04N 23/90 |
| 2017/0213087 A1* | 7/2017 | Chen | G06V 20/42 |
| 2017/0333777 A1* | 11/2017 | Spivak | G06V 40/23 |
| 2018/0154232 A1* | 6/2018 | Gentil | A63B 71/0605 |
| 2018/0170514 A1* | 6/2018 | Bennett | G01S 13/66 |
| 2018/0200605 A1* | 7/2018 | Syed | A63B 69/3605 |
| 2018/0270413 A1* | 9/2018 | Sakashita | H04N 23/80 |
| 2019/0147219 A1* | 5/2019 | Thornbrue | G06T 7/254 |
| | | | 348/169 |
| 2019/0299073 A1* | 10/2019 | Vollbrecht | G06V 20/52 |
| 2020/0348385 A1* | 11/2020 | Schindler | G01S 7/4817 |
| 2022/0284628 A1* | 9/2022 | Tuxen | A63B 71/0616 |
| 2022/0383636 A1* | 12/2022 | Imes | H04N 23/611 |

* cited by examiner

GOLF BALL TRACKING SYSTEM AND METHODS

RELATED APPLICATIONS

This application is a continuation of U.S. application Ser. No. 17/208,860, filed on Mar. 22, 2021 claims priority to U.S. provisional application 62/993,344 filed on Mar. 23, 2020, which application is incorporated by reference in its entirety.

BACKGROUND

The present disclosure relates generally to golf ball sensing systems, and more particularly to systems for sensing, calculating and/or otherwise determining a location and/or distance of a golf ball, or other sports object, with respect to one or more physical reference points and related methods. Golf is a sport that is continuing to grow in popularity. One of golf's main attractions to enthusiasts is the continual challenge to improving one's game. To become an adept golfer and to maintain golfing proficiency, a significant amount of practice is required. However, in order to reap maximum benefit from such practice, it is desirable that the golfer receive feedback on his or her performance in relative temporal proximity to the performance. One example of such feedback is the location of a golf ball, distance traveled by the golf ball, and/or the distance from the golf ball to a known reference point, such as the tee or hole of one or more golf course holes and/or driving ranges. Accordingly, there is a need for a golf ball tracking system and related methods.

It should be noted that this Background is not intended to be an aid in determining the scope of the claimed subject matter nor be viewed as limiting the claimed subject matter to implementations that solve any or all of the disadvantages or problems presented above. The discussion of any technology, documents, or references in this Background section should not be interpreted as an admission that the material described is prior art to any of the subject matter claimed herein.

SUMMARY

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

In one implementation, a golf ball tracking system comprises a camera configured to capture a plurality of image frames of a golf surface, a memory configured to store the plurality of image frames, and a processor. The processor may be configured to identify at least a first pixel at which a golf ball is located in a first image frame of the plurality of image frames, identify at least a second pixel at which the golf ball is located in a second image frame of the plurality of image frames, determine that the first pixel represents a location where the golf ball impacts the golf surface based at least in part on a difference in location between the first pixel in the first image frame and the second pixel in the second image frame, identify at least a third pixel corresponding to at least a first calibration marker in the first image frame, and determine at least one of a location and a distance of the golf ball with respect to a reference point based at least in part on the location of the first pixel and the location of the at least third pixel in the first image frame. One or more of the camera, the memory, and the processor may be mounted to and/or disposed within an unmanned aerial vehicle.

In another implementation, a golf ball driving range comprises a plurality of targets and at least one unmanned aerial vehicle. The unmanned aerial vehicle comprises a camera configured to capture a plurality of image frames and a memory configured to store the plurality of image frames. The golf ball driving range may also comprise a processor configured to determine a location of a golf ball on the driving range with reference to at least one of the plurality of targets. The processor may be disposed within the unmanned aerial vehicle.

BRIEF DESCRIPTION OF THE DRAWINGS

The patent or application file contains at least one drawing executed in color. Copies of this patent or patent application with color drawing(s) will be provided by the Office upon request and payment of the necessary fee.

Various embodiments are discussed in detail in conjunction with the Figures described below, with an emphasis on highlighting the advantageous features. These embodiments are for illustrative purposes only and any scale that may be illustrated therein does not limit the scope of the technology disclosed. These drawings include the following figures, in which like numerals indicate like parts.

DETAILED DESCRIPTION

The following detailed description is directed to certain specific embodiments. However, the disclosure can be embodied in a multitude of different ways. Reference in this specification to "one embodiment" or "an embodiment" means that a particular feature, structure, or characteristic described in connection with the embodiment is included in at least one embodiment. The appearances of the phrase "in one embodiment," "according to one embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, one or more features may be described for one embodiment which can also be reasonably used in another embodiment.

Figure 1:
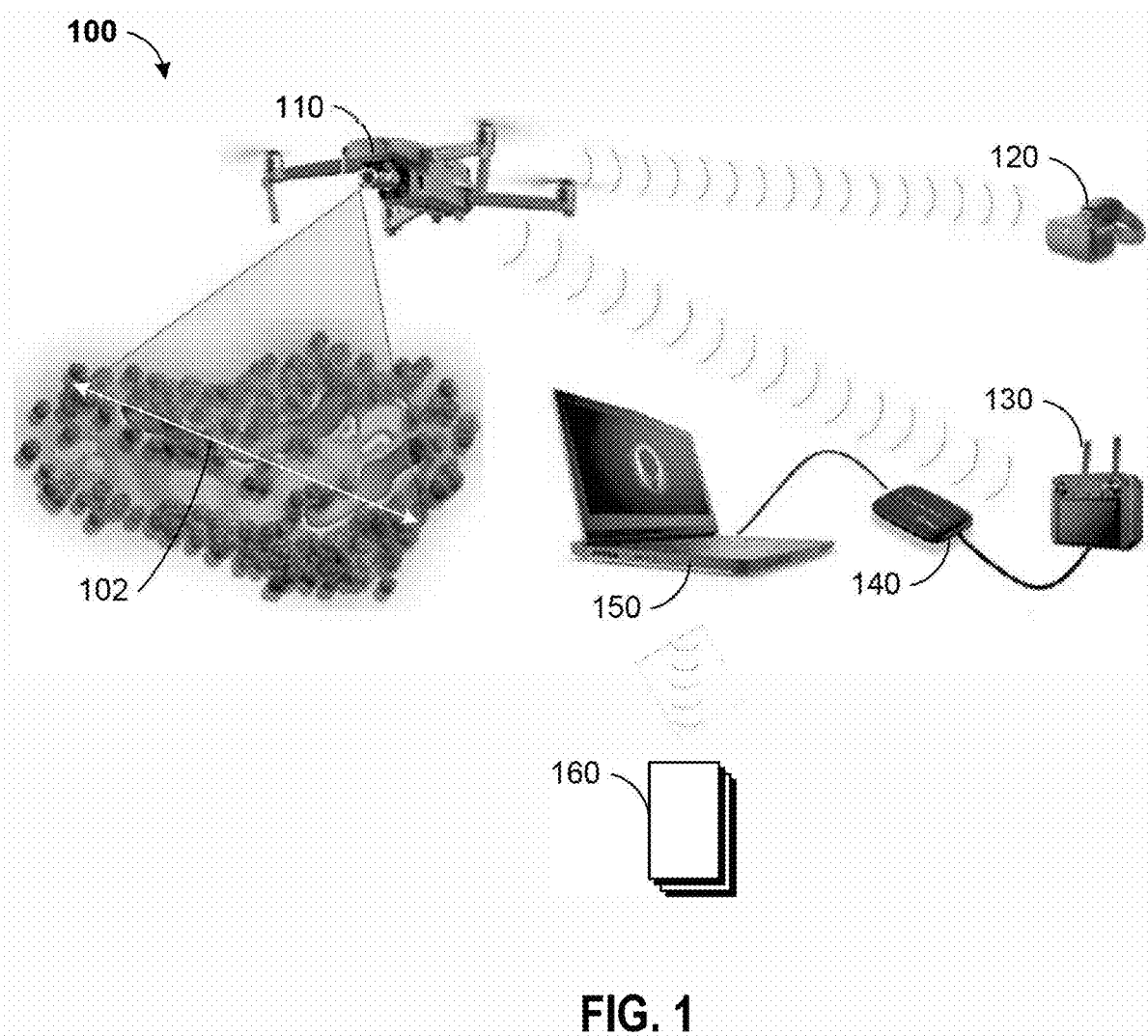
FIG. 1 illustrates an example of a system for determining, identifying and/or sensing a location and/or distance of a golf ball with respect to one or more reference points, according to some embodiments.

FIG. 1 illustrates an example of a system 100 for determining a location and/or distance of a golf ball with respect to one or more reference points, according to some embodiments. In some embodiments, system 100 can include a UAV 110 configured to fly over and/or along a golf surface (e.g., a driving range and/or a golf course) and capture a plurality of image frames of portions of the golf surface that are ultimately utilized to determine a location and/or distance of a golf ball with respect to one or more reference points (e.g., with respect to a golf tee, a golf hole, and/or one or more stationary markers disposed at one or more locations on, over or along the golf surface). In some embodiments, UAV 110 can be configured with GPS-intelligent flight modes that allow manual, autonomous, or semi-autonomous flight of UAV 110 to or from a desired location and/or along a desired flight path over or along the golf surface. An example of such a UAV includes but is not limited to the DJI Mavic 2 Zoom UAV.

In some embodiments, UAV 110 can include a camera 116 (see FIG. 2) configured to capture image frames at a resolution of, for example, 1080p (i.e., 1920×1080 pixels) and at a frame rate of, for example, 60 frames per second (FPS). However, the present disclosure is not so limited and camera 116 of UAV 110 can be configured to capture images of any suitable or desired resolution and at any suitable or desired frame rate. In some cases, camera 116 of UAV 110 can have a 3-axis camera gimbal for stabilizing image capture, though the present disclosure is not so limited.

Camera 116 of UAV 110 (see FIG. 2) has a field of view (FOV) 102, which indicates the angle through which camera 116 is configured to capture image frames of the golf surface below. With increasing camera resolution comes the ability for UAV 110 to fly at higher altitude and encompass a larger FOV, while still providing sufficient resolution to discern golf ball positions on the golf surface. For example and not limitation, if camera 116 of UAV 110 captures images at 1080p resolution (e.g., progressive scan of 1920×1080 pixels per image frame) at an altitude of 125 feet and with an approximate 50 yard×30 yard FOV, a golf ball would be expected to show up as a single pixel in the captured image (e.g., roughly assuming 30 yards is 100 feet, a golf ball is approximately 0.1 feet in diameter, and the 30 yard FOV is captured with 1080 pixels). Of course, where golf ball detection is carried out while the golf ball is in motion, the golf ball may blur across multiple pixels and so the golf ball may affect multiple pixels.

System 100 can further include a camera controller 120 configured to control camera 116 of UAV 110. Controller 120 can be configured to wirelessly communicate with at least UAV 110 and, in some cases, display one or more image frames and/or videos that the camera has captured. In some embodiments, controller 120 can provide a live view of image capture that is controlled by adjusting the head orientation of the user of controller 120. However, the present disclosure is not so limited and controller 120 can be configured to control camera 116 of UAV 110 according to any suitable method including but not limited to manual controls. An example of such a camera controller can include but is not limited to DJI Racing Goggles.

System 100 can further include a UAV controller 130. UAV controller 130 is configured to communicate with UAV 110 and to control flight and operation of UAV 110, either manually or by inputting one or more commands that instruct UAV 110 to autonomously or semi-autonomously execute a particular flight plan over and/or along the golf surface.

In some embodiments, UAV controller 130 is further configured to receive image data from UAV 110. In some embodiments, UAV 110 can be configured to store image data in its local memory storage 114 (see FIG. 2) for subsequent download and/or processing by UAV controller 130 or another computing device. This functionality may relate to a post-processing embodiment, since the image data captured by the camera is stored in memory 114 of UAV 110 and processed after landing and subsequent download of the image data to another computing device (e.g., UAV controller 130 and/or computing device 150). Such post-processing embodiments may be advantageous at least in the sense that an algorithm capable of and configured to process captured image frames in real-time is not required, since image data may not be processed until UAV 110 lands and the data stored thereon is downloaded or otherwise transferred to, e.g., computing device 150. In addition, since the image data need not be streamed in real-time or near real-time nor processed onboard UAV 110, higher resolution video and/or image data can be captured and stored locally in, e.g., memory 114, allowing for potentially more accurate golf ball distance and/or location determinations.

In some embodiments, UAV 110 can be configured to stream image data in real-time or near real-time to UAV controller 130 or another computing device (e.g., computing device 150) for processing outside of UAV 110. This functionality may be considered a streaming embodiment, since the image data captured by camera 116 is either not, or minimally, processed by UAV 110 and is instead wirelessly streamed to UAV controller 130 and/or another computing device (e.g., computing device 150) where the image data is processed. Such streaming embodiments may be advantageous at least in the sense that near-instant golf ball detection can be provided within the FOV of UAV 110 and the streaming can be integrated with broadcasting capabilities of wireless communication networks. However, such wireless streaming links tend to be less reliable and more error-prone than some other closer-range and/or wired communication protocols that may be utilized with the above-described post-processing embodiments. An example of such a UAV controller 130 can include but is not limited to the DJI Smart Controller, which offers an Occusync™ 2.0 protocol that supports high-definition video streaming.

In some embodiments, UAV 110 can be configured to, itself, process the image data in real-time or near real-time and communicate the calculated location(s) and/or distance(s) of the golf ball(s) to UAV controller 130 or another computing device (e.g., computing device 150 and/or user device 160). This functionality may be considered an onboard processing embodiment, since the image data captured by camera 116 is processed by one or more processors 112 (see FIG. 2) onboard UAV 110. Such onboard embodiments may be advantageous at least in the sense that near-instant golf ball detection can be provided and the streaming can be integrated with broadcasting capabilities or wireless communication networks. In addition, since golf ball detection is carried out onboard, full resolution images need not be streamed, downloaded or otherwise transmitted via potentially more error-prone, longer-range wireless communication protocols. In some embodiments, such real-time image processing capabilities may involve a heightened minimum processing capability of the hardware and software onboard UAV 110 compared to either the post-processing or streaming embodiments described above.

System 100 can further include a computing device 150, which can be a personal computer, a laptop, a smart device, a server or any other computing device suitable for receiving, processing, storing, transmitting and/or displaying image data or any other data related to determination of a location and/or distance of a golf ball with respect to one or more reference points.

In some embodiments, computing device 150 is connected with UAV controller 130 through a streaming capture device 140. In some embodiments, UAV controller 130 communicates with UAV 110 wirelessly and communicates with streaming capture device 140 via an HDMI cable, while streaming capture device 140 communicates with computing device 150 via a USB3 cable. However, the present disclosure is not so limited and UAV controller 130, streaming capture device 140 and computing device 150 can communicate with one another via any suitable medium or mediums, including wireless communication mediums. In some embodiments, UAV controller 130 can be configured to communicate image data and/or other data directly with computing device 150 without utilizing streaming capture device 140. In some other embodiments, UAV 110 can be configured to communicate image and/or other data directly to computing device 150 without having to first communicate it through either UAV controller 130 or streaming media device 140. In such embodiments, UAV controller 130 may function to control the flight and other operations of UAV 110 and not to mediate communication of image data and/or other data related thereto to computing device 150.

System 100 can further include one or more user devices 160, which may be the user's smartphone but could also or alternatively be any other computerized user terminal, configured to receive data regarding the location and/or distance of a golf ball with respect to one or more reference points. For example, as will be described in more detail in connection with one or more of the following figures, user devices 160 can include golfers' smartphones and may be configured to run a program or application (i.e., app) that receives at least determined location and/or distance data of their golf ball from computing device 150. Accordingly, golfers can receive feedback as to their level of play as it relates to the location and/or distance of their golf ball(s) with respect to one or more reference points (e.g., the golf tee, hole, stationary markers on or along the golf surface, etc.) in real-time or near real-time on the course or at the driving range.

Figure 2:
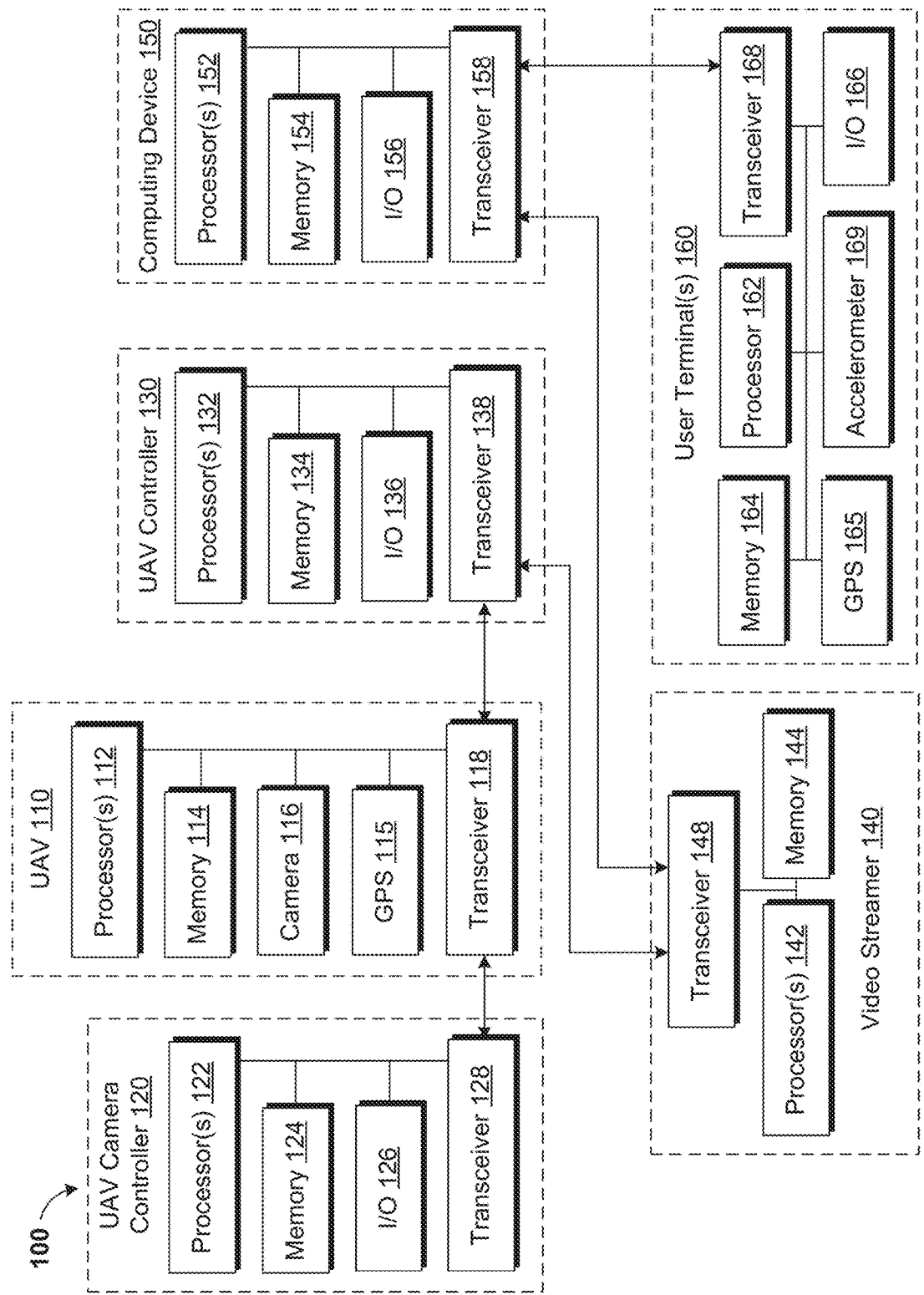
FIG. 2 illustrates an example block diagram of several example components of the system of FIG. 1, according to some embodiments.

FIG. 2 illustrates an example block diagram of several example components of system 100 of FIG. 1, according to some embodiments. UAV 110 is illustrated as having one or more processor(s) 112, one or more memories 114, camera 116, a GPS module 115 and a transceiver 118. The one or more processor(s) 112, alone or in conjunction with memory 114 are configured to execute one or more instructions, programs and/or applications for capturing, saving and/or processing image data for determining, identifying and/or sensing a location and/or distance of a golf ball with respect to one or more reference points as described anywhere in this disclosure. Camera 116 is configured to capture image data as described anywhere in this disclosure. GPS module 115 is configured to determine the GPS position and/or coordinates of UAV 110, which may be used for navigating and/or otherwise operating UAV 110. Transceiver 118 can comprise at least one antenna, at least one transmitter and at least one receiver, which are configured, alone or in combination, to communicate image data and/or other data between UAV 110 and any one or more of UAV camera controller 120, UAV controller 130, computing device 150, video streamer 140 and user terminal(s) 160 as described anywhere in this disclosure.

UAV camera controller 120 is illustrated as having one or more processor(s) 122, one or more memories 124, one or more input/output (I/O) peripherals 126 and a transceiver 128. The one or more processor(s) 122, alone or in conjunction with memory 124 are configured to execute one or more instructions, programs and/or applications for controlling camera 116 of UAV 110 as described anywhere in this disclosure. I/O peripherals 126 can include, but are not limited to, a display, a speaker, an accelerometer, a gyroscope or any other controls for directing camera 116 of UAV 110, or any other input or output device configured to receive information and/or other data from or provide information and/or other data to a user of UAV camera controller 120. Transceiver 118 can comprise at least one antenna, a transmitter and a receiver, which are configured, alone or in combination, to communicate image data and/or other control data between UAV camera controller 120 and at least UAV 110, as described anywhere in this disclosure.

UAV controller 130 is illustrated as having one or more processor(s) 132, one or more memories 134, one or more input/output (I/O) peripherals 136 and a transceiver 138. The one or more processor(s) 132, alone or in conjunction with memory 134 are configured to execute one or more instructions, programs and/or applications for controlling UAV 110, receiving, processing and/or transmitting image data and/or other data, as described anywhere in this disclosure. I/O peripherals 136 can include, but are not limited to, a display, a speaker, an accelerometer, a gyroscope or any other controls for directing UAV 110 and/or for displaying image data from camera 116 of UAV 110. Transceiver 118 can comprise at least one antenna, a transmitter and a receiver, which are configured, alone or in combination, to communicate image data and/or other control data between UAV controller 130 and any one or more of UAV camera controller 120, UAV controller 130, computing device 150, video streamer 140 and user terminal(s) 160 as described anywhere in this disclosure.

Video streamer 140 is illustrated as having one or more processor(s) 142, one or more memories 144 and a transceiver 148. The one or more processor(s) 142, alone or in conjunction with memory 144 are configured to execute one or more instructions, programs and/or applications for ultimately streaming image data and/or other data between UAV controller 130 and computing device 150 as described anywhere in this disclosure. In some embodiments, transceiver 148 can comprise at least one antenna. In some embodiments, transceiver 148 includes a transmitter and a receiver, configured, alone or in combination, to stream image data and/or other data between UAV controller 130 and at least computing device 150 as described anywhere in this disclosure.

Computing device 150 is illustrated as having one or more processor(s) 152, one or more memories 154, one or more input/output (I/O) peripherals 156 and a transceiver 158. The one or more processor(s), alone or in conjunction with memory 154 are configured to execute one or more instructions, programs and/or applications for determining, identifying and/or sensing a location and/or distance of a golf ball with respect to one or more reference points as described anywhere in this disclosure. I/O peripherals 156 can include, but are not limited to, a display, a keyboard, a speaker, a mouse or any other controls for determining, identifying and/or sensing a location and/or distance of a golf ball with respect to one or more reference points as described anywhere in this disclosure. In some embodiments, transceiver 158 can comprise at least one antenna, a transmitter and a receiver, which are configured, alone or in combination, to receive and/or transmit image data, golf ball location and/or distance data, and/or other data from and/or to any device of system 100 as described anywhere in this disclosure.

User terminal(s) 160 is illustrated as having one or more processor(s) 162, one or more memories 164, one or more input/output (I/O) peripherals 166 and a transceiver 168. The one or more processor(s) 162, alone or in conjunction with memory 164 are configured to execute one or more instructions, programs and/or applications for tracking and/or displaying determined locations and/or distances of one or more golf balls with respect to one or more reference points as described anywhere in this disclosure. I/O peripherals 166 can include, but are not limited to, a display, a keyboard, a speaker, or any other controls for tracking and/or displaying determined locations and/or distances of one or more golf balls with respect to one or more reference points as described anywhere in this disclosure. Transceiver 168 can comprise at least one antenna, a transmitter and a receiver, which are configured, alone or in combination, to communicate image data and/or other data between user terminal 160 and any device of system 100 as described anywhere in this disclosure.

In some embodiments, system 100 can further include one or more markers, as will be described in more detail below, for example, in connection with at least FIG. 8.

Figure 3:
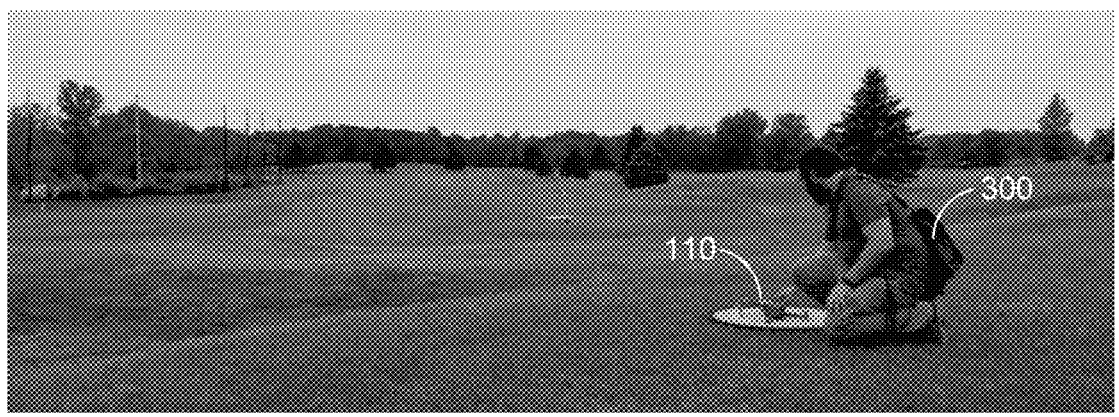
FIG. 3 illustrates an example kit storing and/or transporting the system of FIG. 1, according to some embodiments.

FIG. 3 illustrates an example kit 300 for storing and/or transporting system 100 of FIG. 1, according to some embodiments. In some embodiments, kit 300 may comprise a backpack or other packaging apparatus configured to store UAV 110, UAV camera controller 120, UAV controller 130, video streamer 140 and computing device 150. In some embodiments, kit 300 may further store one or more user terminals 160. In some embodiments, kit 300 may further store one or more markers, as will be described in more detail below in connection with at least FIG. 8. Kit 300 may comprise a different storage compartment for each device or component of system 100 or, alternatively, may comprise a different storage compartment for only a subset of the devices or components of system 100. Kit 300 allows system 100 to be easily transported from location to location, or to be stored between uses.

Image processing carried out by system 100 in order to determine locations and/or distances of one or more golf balls with respect to one or more reference points will now be described in connection with FIGS. 4A-13.

There are several aspects to determining a location and/or distance of a golf ball with respect to one or more reference points, as contemplated by the present disclosure. A series of image frames of a golf surface are captured by camera 116 of UAV 110. Monitoring and processing of each captured image frame can be carried out by the processor and/or memory of any one or more of UAV 110, UAV controller 130, computing device 150, or user terminal(s) 160, depending upon whether the above-described post-processing, streaming or onboard embodiment(s), or any combination thereof, is utilized.

Each of the image frames in the series is analyzed for the presence of a golf ball. FIGS. 4A-7 illustrate example embodiments for monitoring image frames and identifying one or more pixels corresponding to the presence of a golf ball, according to some embodiments.

Since the orientation of the golf surface and a general direction of play is generally known in advance, a predetermined portion of each image frame, rather than the entirety of each image frame, can be analyzed for the presence of a golf ball. In some embodiments, this predetermined portion can be a top portion of each image frame. However, the present disclosure is not so limited and any predetermined portion of the image frames can be monitored, including the entire image frame in some embodiments. This predetermined portion would desirably abut an edge of the image frames, since all golf balls will enter an image frame from an edge and would be first detected near such an edge. The golf ball can be identified as being located at one or more pixels in an image frame.

Any suitable method of image detection can be utilized and is contemplated by this disclosure. FIGS. 4A-7 illustrate one example embodiment that analyzes frame-to-frame motion and color changes to identify the presence of a golf ball at one or more pixels within an image frame.

Figure 4A:
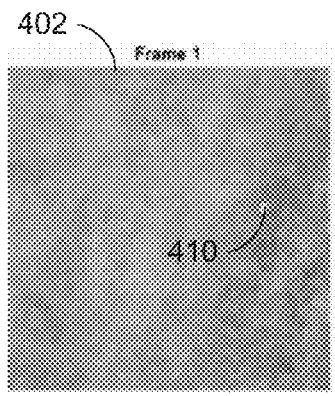
FIGS. 4A-4C illustrate portions of successive image frames of a golfing surface that each include a golf ball, as captured by the system of FIG. 1, according to some embodiments.
Figure 4B:
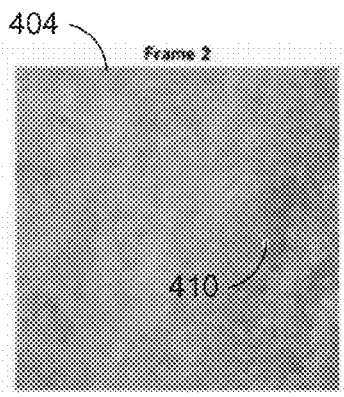
Figure 4C:
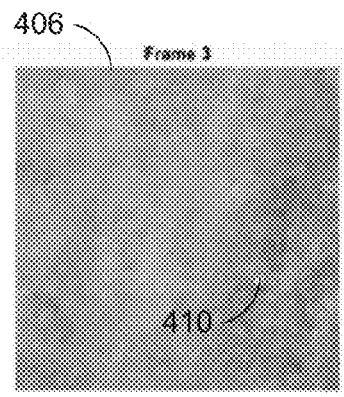
Figure 5A:
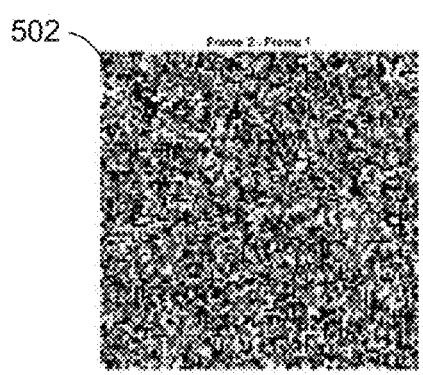
FIG. 5A illustrates a subtraction mask resulting from subtracting the pixels of the image of FIG. 4A from the image of FIG. 4B, according to some embodiments.
Figure 5B:
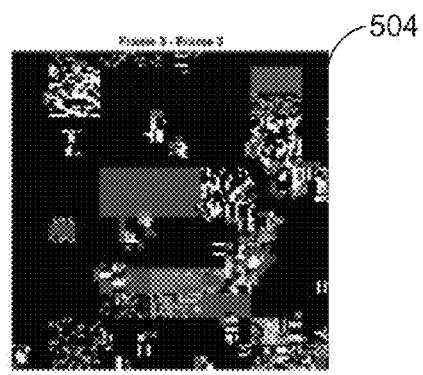
FIG. 5B illustrates a subtraction mask resulting from subtracting the pixels of the image of FIG. 4B from the image of FIG. 4C, according to some embodiments.
Figures 6A, 6B:
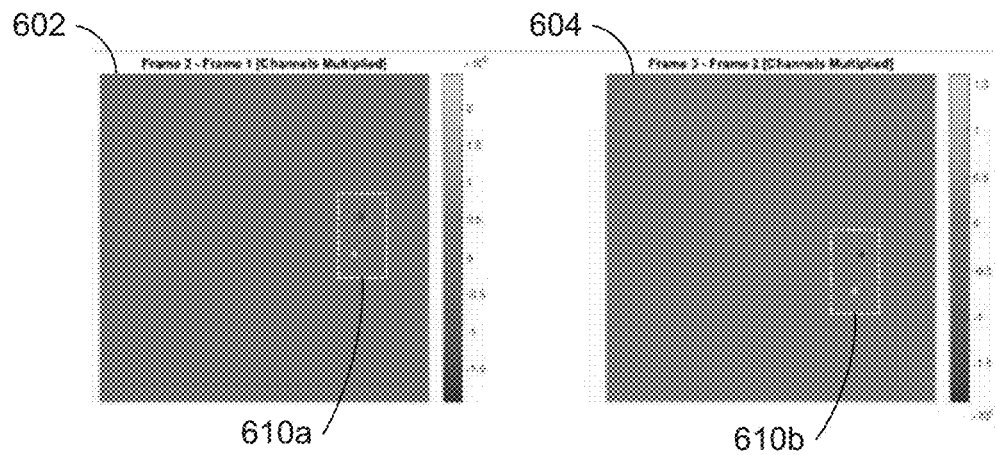
FIG. 6A illustrates a multiplication mask resulting from multiplying the color channels for each pixel of the subtraction mask of FIG. 5A, according to some embodiments.
FIG. 6B illustrates a multiplication mask resulting from multiplying the color channels for each pixel of the subtraction mask of FIG. 5B, according to some embodiments.

FIGS. 4A-4C illustrate portions of three successive image frames 402, 404, 406 of a golf surface including a golf ball 410. The pixels of the first image frame 402 are subtracted from the corresponding pixels of the second image frame 404 and the pixels of the second image frame 404 are subtracted from the corresponding pixels of the third image frame 406. FIG. 5A illustrates a subtraction mask 502 resulting from the subtraction of first image frame 402 from second image frame 404, while FIG. 5B illustrates a subtraction mask 504 resulting from the subtraction of second image frame 404 from third image frame 406. Subtraction masks 502, 502 provide the pixel by pixel changes from first image 402 to second image 404 and from second image 404 to third image 406, respectively.

Since the appearance, disappearance or movement of a golf ball is not the only potential change that can occur between successive image frames, subtraction masks 502, 504 may not accurately and reliably identify a pixel change in the subtraction masks 502, 504 as indicative of the presence of a golf ball. However, each subtraction mask 502, 504 has a plurality of color channels (e.g., a channel for red content of the pixels, a channel for blue content of the pixels and a channel for green content of the pixels).

Figure 7:
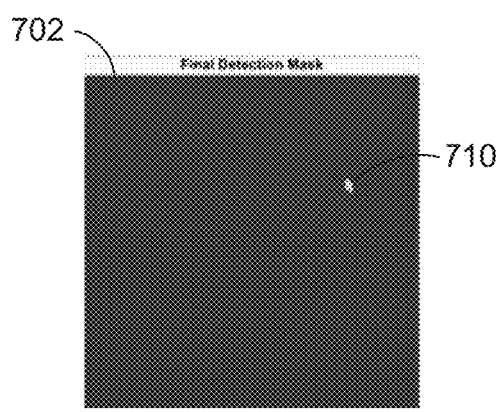
FIG. 7 illustrates a binary mask of the determined position of the golf ball based at least in part on the multiplication masks of FIGS. 6A and 6B, according to some embodiments.

Since a golf ball is customarily white, and white is the presence of substantially equal and/or maximum amounts of red, blue and green light, multiplying the plurality of color channels of subtraction masks 502, 504 can amplify the movement of white objects, such as a golf ball, while simultaneously attenuating the movement of other objects. Accordingly, the corresponding pixel values of each of the color channels of subtraction mask 502 are multiplied together to produce multiplication mask 602 of FIG. 6A, while the corresponding pixel values of each of the color channels of subtraction mask 504 are multiplied together to produce multiplication mask 604 of FIG. 6B. As illustrated in the dotted lined boxes 610a, 610b of FIGS. 6A, 6B, respectively, pixels where the golf ball was in a previous image frame and no longer is in a next frame, or where the golf ball was not in a previous image frame but is in the next frame, between image frames 402, 404, 406, produce very small or very large pixel values, respectively, relative to the average pixel values in multiplication masks 602, 604. Since the pixels where the golf ball is in a particular image frame but is not in the next successive image frame translates to a color change from substantially white (e.g., the presence of high levels of red, blue and green pixel light) to a random color (or a color generally near that of the golf surface), pixel(s) in first image frame 402 can be identified as indicating the presence of a golf ball at least partly based on corresponding pixels in multiplication mask 602 having a minimum, substantially minimum, or near minimum value. Accordingly, binary mask 702 of FIG. 7 illustrates values indicating presence of a golf ball at the pixel(s) corresponding to pixels in multiplication mask 602 having a minimum, substantially minimum, or near minimum value. Of course, maximum values could also be utilized to identify the pixel location, or previous pixel location, of a golf ball.

The above subtraction, multiplication and minimizing procedure can be carried out for each image frame and, e.g., two successive image frames, to determine golf ball pixels in each image frame. Code for carrying out the procedures, algorithms and/or functions described in this disclosure can be written and/or executed in any suitable programming language, e.g., C++ with OpenCV and Cuda extensions.

Once a golf ball is detected in an image frame, a region of interest (ROI) of the image is determined (e.g., a subset of pixels that includes the pixel(s) at which the golf ball is detected). Once a golf ball has been detected and a ROI is determined, the ROI and, in some embodiments, the previously-described predetermined portion, of each image frame is successively analyzed from image frame to image frame to identify one or more pixel(s) in each image frame at which a golf ball is located. In some embodiments, when a golf ball, that has been previously detected in an image frame and for which an ROI has been determined, is no longer detected in an image frame (e.g., the golf ball has left the FOV of camera 116), the ROI associated with that golf ball may no longer be analyzed in one or more successive image frames. In this way, and since a ROI is determined for each golf ball identified in an image frame, multi-shot tracking of multiple golf balls can be simultaneously provided, while reducing the computational burden of golf ball detection.

Once a golf ball has been detected in a series of image frames, a pixel of impact for the golf ball is determined. A pixel of impact can be defined as the one or more pixels in an image frame where the golf ball is located at the time the golf ball impacts the golf surface after being hit. This pixel of impact can be determined based on deceleration of the golf ball, as determined by comparison between the pixel locations of the golf ball in two successive image frames. For example, a flying golf ball will be identified at pixels in successive images that are displaced from one another by an amount proportional to the golf ball's speed through the air during the timeframe between the capture of the two successive image frames. At impact with the golf surface, the golf ball decelerates greatly. Accordingly, the pixel(s) at which the golf ball is identified in the successive image frames captured immediately after impact with the golf surface will be displaced from one another by an amount that is, abruptly, significantly smaller than between immediately prior successive image frames. Thus, the pixel of impact can be defined as the golf ball pixel in the first image frame of successive image frames in which the displacement of the golf ball pixel from the first image frame to the next image frame substantially decreases (e.g., decreases by at least a threshold amount, decreases by a greatest or maximum amount, or decreases to substantially zero), compared to the displacement of the golf ball pixel between prior successive image frames.

Once the pixel of impact of the golf ball has been identified in an image frame (e.g., the impact frame), the location and/or distance of the golf ball with respect to one or more reference points is determined. In some embodiments, this determination involves translating image frame pixels to real-world location and/or distance values, e.g., inverse homography. The present disclosure contemplates several methods for accomplishing this translation from pixels to real-world golf ball locations and/or distances.

One example option is to utilize GPS of UAV 110 to establish the altitude and position from which the image frames were captured by camera 116. With such an option, placement of physical markers on or along the golf surface to establish scale, context and reference for the pixels of captured images may not be required. Moreover, GPS signals can be encrypted for increased security and privacy in communications with UAV 110. However, the accuracy of such GPS positioning can vary and GPS coordinates alone do not generally provide substantially accurate detection of yaw angle of UAV 110, which affects the angle, relative to the golf surface, at which the image frames are captured and, so, affects the translation of image pixels to real world locations and/or distances. Accordingly, with such an example option, supplementary yaw angle analysis of UAV 110 and/or camera 116 can be beneficial.

Another example option is to use one or more April tags disposed at known locations on or along the golf surface to determine a reference point and a relative orientation between the April tag and UAV 110. An april tag is similar to a larger version of a QR code, having a readable block-encoded surface that encodes a relatively small amount of data (e.g., single to tens of bits) that can be used to determine not only the identity of the April tag, but it's relative orientation with respect to a camera capturing an image of the block-encoded surface. Since the relative shape and dimension of the markings on the block-encoded surface are predefined, distortions in this relative shape and dimension of the markings can be used to determine the relative angle between the camera and the readable block-encoded surface of the captured tag. Accordingly, a single April tag may allow for identification of a reference point within captured image frames and a relative orientation of the UAV 110 and/or camera 116 from the golf surface and/or the marker surface for translating pixels to real-life locations and/or distances. However, April tags can be relatively bulky, having a block-encoded surface large enough to be resolved at suitable distances and must be placed on or along the golf surface. In some cases, embodiments utilizing a single April tag may still suffer from relatively inaccurate yaw detection for UAV 110 by virtue of the small dimensions of the April tag and inability to resolve small differences in relative dimensions of the block-encoded surface necessary to detect sufficiently small differences in the relative angle between the block-encoded surface and camera 116.

Yet another example option is to use the flag at the pin of a golf hole to determine a reference point and a relative orientation between the flag or pin and UAV 110. With such an option, physical markers may not be required for establishing the reference point and relative orientation. However, the presence of non-standardized flags or wind can compromise the ability to provide accurate translations from pixels to locations and/or distances, altitude of the UAV 110 and accurate detection of the yaw angle of UAV 110 during capture.

Yet another example option is to use aeropoints, by Propeller Aero, to determine a reference point and a relative orientation for UAV 110. Aeropoints are configured to report their positions relative to one another to within centimeter accuracy utilizing GPS and are solar powered. However, they are relatively expensive, relatively large in physical dimension and data they provide must be post-processed, adding to the computational load of any computing device that ultimately determines the locations and/or distances of the golf ball.

Yet another example option is to use inanimate cones or flat markers disposed at known, static locations and/or distances with respect to one another on or along the golf surface to establish reference points for such pixel-to-real-world location and/or distance translations. FIG. 8 illustrates a portion of an image frame 800 of a golfing surface including a plurality of markers 802, 804, 806, 808, 814 and a golf hole 812, according to some embodiments. As illustrated, each of markers 802, 804, 806 and 808 are placed a first predetermined distance from hole 812 (e.g., 10 yards—30 feet) or from another desired feature on the golf surface and squared such that each marker 802, 804, 806, 808 is also a second predetermined distance (e.g., 42 feet, 5 inches) from each of its adjacent markers. This ensures markers 802, 804, 806, 808 form a square or regular diamond centered about golf hole 812. Markers 802, 804, 806, 808 can be placed in their proper positions using any suitable method, for example, placing each marker the first predetermined distance from golf hole 812 using a first measuring tape and ensuring each marker is also placed the second predetermined distance from each of its adjacent markers using a second measuring tape. It is further contemplated that markers 802, 804, 806, 808, or a subset thereof, can be placed in any other pattern that similarly allows the establishing of reference points for such pixel-to-real-world location and/or distance translations To initially or continually verify the accuracy of real-world locations and/or distances determined from pixel locations, another marker 814 can be placed at a known location and/or a known distance from any of markers 802, 804, 806, 808 and/or golf hole 812 and the known distance or location of additional marker 814 can be compared to a calculated distance or location for additional marker 814 to ensure the two values satisfy an appropriate accuracy threshold.

Pixels corresponding to physical calibrated markers, disposed at known, static locations and/or distances with respect to one another on or along the golf surface can be identified in the impact frame using any suitable method, including those described above for identifying golf ball pixels or similar methods. Since the markers are disposed at known, static locations and/or distances with respect to one another, identified pixels in the impact frame corresponding to these markers can be used for at least two purposes: (1) to determine a 3-dimensional location and orientation of camera 116 of UAV 110 with respect to the markers, and (2) to determine a real-world location and/or distance of the golf ball with respect to one or more reference points (e.g., the golf tee, a prior location of the golf ball in play on the golf surface, a golf hole, and/or one or more of the above-described calibrated markers). For example, the relative orientation of camera 116 of UAV 110 can be determined based on a distortion between the relative locations of pixels in an image frame that correspond to markers 802, 804, 806, 808 and the actual, known relative real-world locations of markers 802, 804, 806, 808. And this determined relative orientation and the relative locations of the pixels in the image frame corresponding to markers 802, 804, 806, 808 can be used to determine the real-world location (e.g., distance) of UAV 110 with respect to markers 802, 804, 806, 808. With this information, the golf ball pixel in the image frame can be used to determine a real-world location and/or distance of the golf ball with respect to one or more of the markers 802, 804, 806, 808, 814, hole 812, or any other point whose position relative to these markers or hole 812 is known or determinable.

Figure 8:
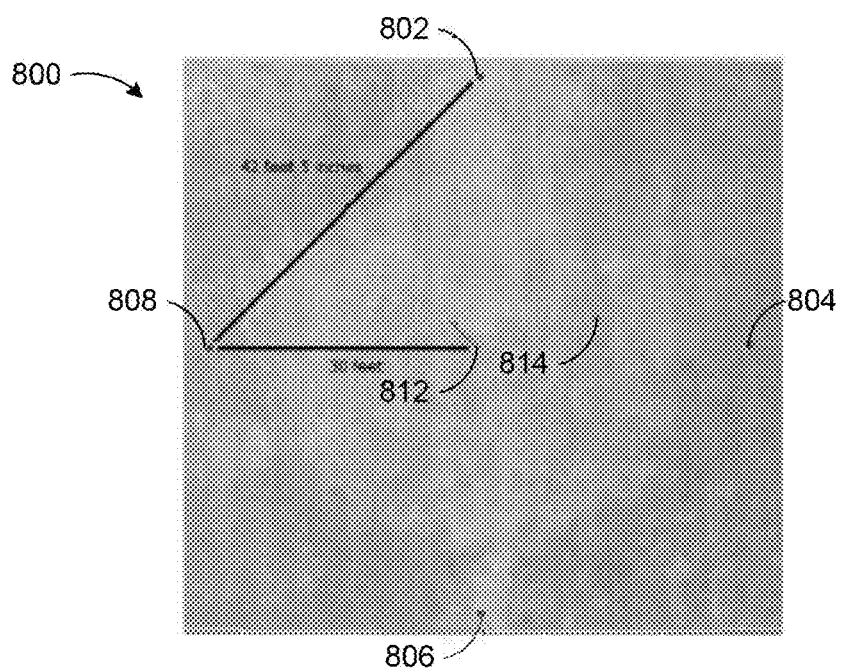
FIG. 8 illustrates a portion of an image frame of a golfing surface including a plurality of markers and a golf hole, according to some embodiments.
Figure 9A:
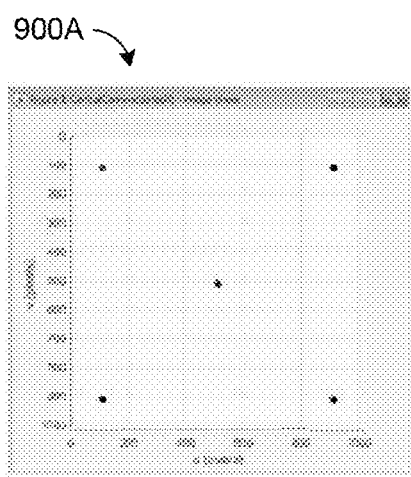
FIG. 9A illustrates a 2-dimensional plot of the pixel positions of at least some of the plurality of markers and the golf hole in the image frame of FIG. 8, according to some embodiments.
Figure 9B:
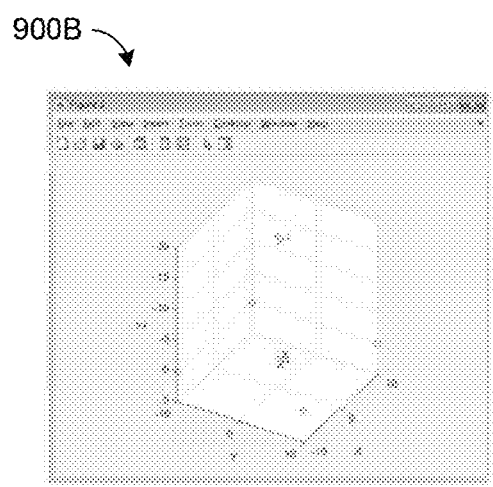
FIG. 9B illustrates a 3-dimensional plot of the determined positions of the plurality of markers relative to the golf hole in the image frame of FIG. 8, according to some embodiments.

FIG. 9A illustrates a 2-dimensional plot 900A of identified pixel positions of markers 802, 804, 806, 808 and golf hole 812, for example, in image frame 800 of FIG. 8, according to some embodiments. FIG. 9B illustrates a 3-dimensional plot 900B of determined or known real-world positions of the plurality of markers relative to the golf hole, for example, in image frame 800 of FIG. 8, according to some embodiments.

Accuracy

There are two components that ultimately determine accuracy of the disclosed system(s): (1) accuracy of the identification of the pixel of impact of a golf ball within an impact frame, and (2) accuracy of the translation from pixel of impact to real-world location and/or distance values.

Regarding the accuracy of the identification of the pixel of impact of the golf ball within the impact frame, an example 1080-pixel FOV that covers 30 yards works out to roughly 36 pixels per yard. Assuming a golf ball is traveling 100 miles per hour and camera 116 is capturing 1080p image frames at a rate of 60 frames per second, the maximum error in determining the impact pixel position is 15 pixels, or approximately 0.4 yards [100 miles per hour×1760 yards per mile=176,000 yards per hour|176,00 yards per hour/3600 seconds per hour/60 frames per second=0.8148 yards per frame|0.8148 yards per frame×36 pixels=29 pixels per frame|Since the minimum velocity may be used for determining the carry distance before impact, the worst case error is the maximum error divided by two and this condition occurs when the golf ball bounces exactly between image frames and the local minimum of velocity is effectively split between two pixel locations].

Regarding the accuracy of the translation from pixel of impact to real-world location and/or distance values, as previously described in connection with FIG. 8, another, fifth marker 814 can be placed within the FOV and at a known location and/or distance from one or more of markers 802, 804, 806, 808 or golf hole 812. The real-world location and/or distance of marker 814 can be repeatedly determined based on the identified pixel locations of the markers 802, 804, 806, 808, 814, similar to how the real-world location of an identified golf ball pixel would be determined. Because the real-world location of marker 814 is already known, it can be compared to the calculated real-world locations of marker 814 to deduce an error associated with pixel-to-real-world location and/or distance in general.

Figure 10:
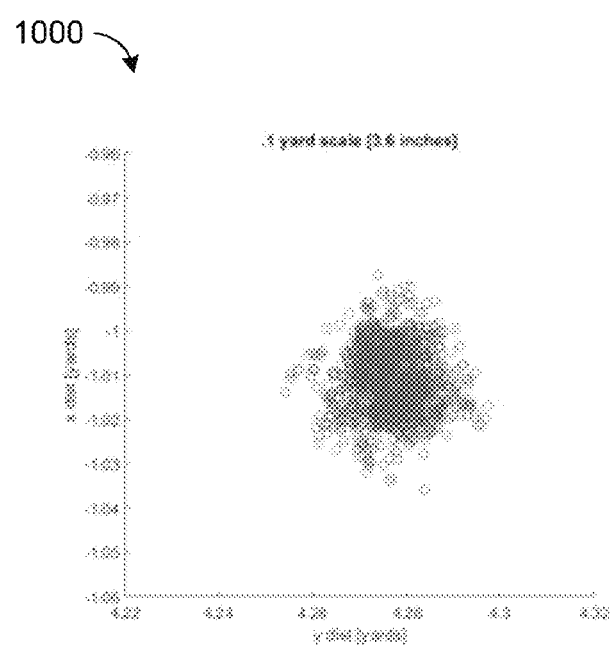
FIG. 10 illustrates a scatter plot of a determined position of one of the plurality markers relative to at least some others of the plurality of markers in the image frame of FIG. 8, according to some embodiments.

FIG. 10 illustrates a scatter plot 1000 of a plurality of determined locations of marker 814 in image frame 800 of FIG. 8, according to some embodiments. As can be seen, the maximum error in pixel-to-yards conversion is about 2 inches or 0.05 yards.

Inverse Trajectory Generation

Figure 11:
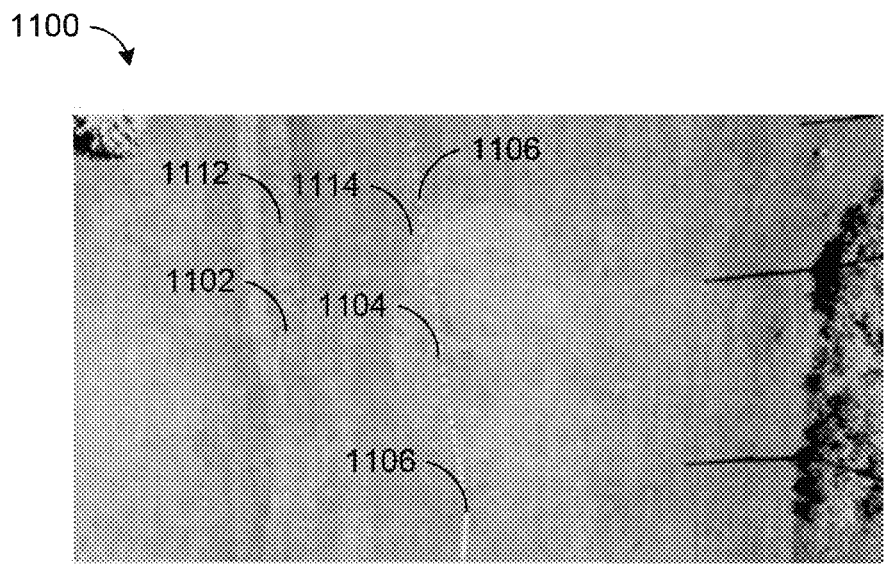
FIG. 11 illustrates at least a portion of an image frame for multi-shot tracking at a driving range, according to some embodiments.

Another implementation in which the golf ball location and/or distance determining aspects of the present disclosure can be used is driving range multi-shot tracking, which allows players to hit a plurality of golf balls at, for example, a driving range and receive statistics of their shots, in some cases including inverse trajectory generation for their shots, downloaded to their smartphone, e.g., user device 160 (see FIG. 1). FIG. 11 illustrates at least a portion of an image frame 1100 for such multi-shot tracking, according to some embodiments. As illustrated, multiple impact pixels 1102, 1104, 1106 are identified for multiple golf balls on the same image frame. The dotted lines 1112, 1114, 1116 may correspond to inverse trajectories for each golf ball, generated based at least in part on the identified impact pixels 1102, 1104, 1106 and/or golf ball pixel identification from and between prior and/or subsequent image frames. In other words, a trajectory of an already-hit golf ball can be calculated after being hit, based on its direction, speed, acceleration and/or the impact characteristics of the golf ball with the golf surface.

Figure 12:
FIG. 12 illustrates at least a portion of an image frame for shot tracking of multiple players across a portion of or all of a round of golf play, according to some embodiments.

Yet another implementation in which the golf ball location and/or distance determining aspects of the present disclosure can be used is in a golf assistant, which allows players to track their play for an entire round of golf, or a subset thereof, on their smartphone (e.g., user device 160, see FIG. 1). In such implementations, a dedicated UAV 110 may be dispatched over each or at least multiple golf holes of the course and user device 160 for a particular golfer can be configured to continuously or intermittently stream or otherwise transmit accelerometer and/or GPS information in real-time or otherwise to one or more of UAV 110 and/or computing device 150, depending upon where golf ball location determination is performed. As a new golf ball pixel is identified based on detection of a moving golf ball within an image frame, the one or more of UAV 110 and/or computing device 150 can determine which player just hit the golf ball based at least in part on the accelerometer and/or GPS data from user device 160 corresponding to each golfer, and/or generation of an inverse trajectory of the golf ball as described above at least in connection with FIG. 11 and, in some cases, further including the known acceleration characteristics and GPS coordinates of the golfers before, during and after a golf ball is hit. In some cases, golf club contact with a golf ball can be analyzed based on a backswing of the golfer. FIG. 12 illustrates at least a portion of an image frame 1200 for shot tracking of multiple players 1202, 1204 across a portion or all of a round of golf play, according to some embodiments.

Multiple UAV Rotation

The present disclosure also contemplates the simultaneous utilization of a plurality of such UAVs 110 on a golf course, driving range or any other playing surface. In some such embodiments, each UAV 110 may be configured to fly, hover and/or service one or more targets, e.g., golf holes, distance targets, and fly back to a local charging station when one or more conditions are met, for example, a battery charge of UAV 110 falls below a predetermined and/or calculated threshold or an error is detected in one or more operations associated with UAV 110. In this way, multiple targets can be serviced simultaneously and such service can continue uninterrupted, potentially indefinitely, so long as there is another UAV 110 available to take over service when a particular UAV is triggered and/or determines to fly back to a charging station and/or to another service location.

Driving Range Targets

Figure 14:
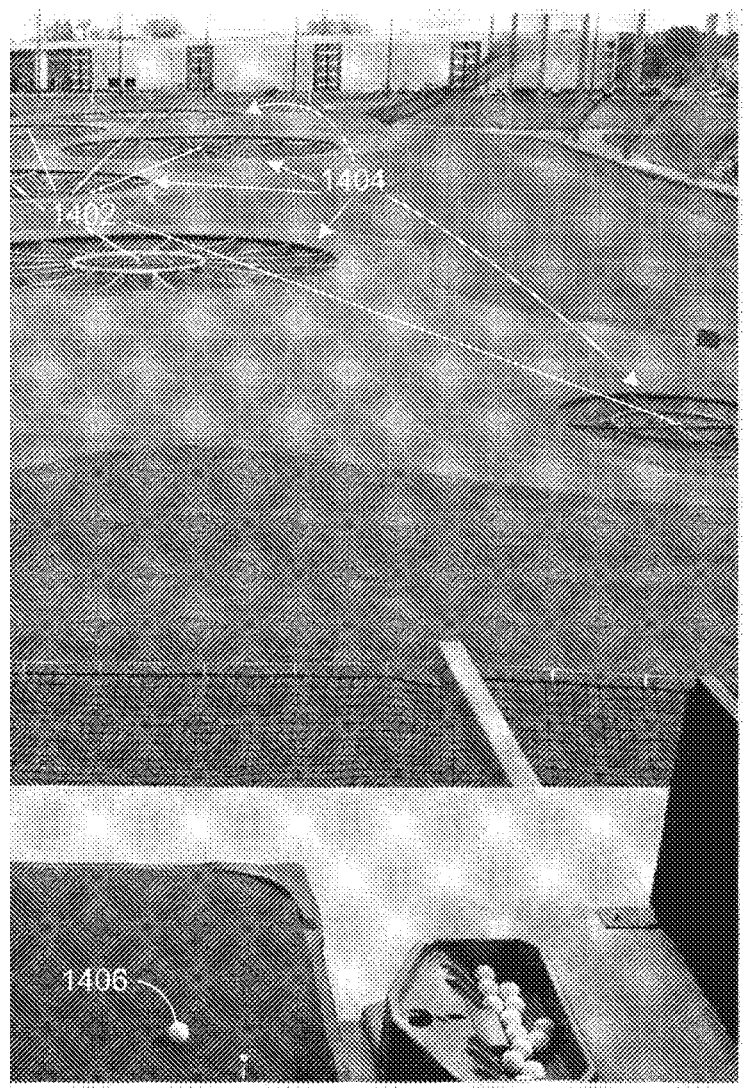
FIG. 14 illustrates an example of a conventional arrangement for sensing a position of a golf ball.

FIG. 14 illustrates an example of a conventional arrangement 1400 for sensing a position of one or more golf balls 1406. Arrangement 1400 includes a plurality of targets 1402, for example, golf holes participants can aim for when driving golf balls 1406. However, in order to accurately sense a position of golf ball 1406, arrangement 1400 also requires that complex electronic ball-detection systems 1404 be installed in the vicinity and/or in relative proximity to each of targets 1402.

In some such arrangements, electronic ball-detection systems 1404 are configured to sense a particular electronic, electromagnetic and/or magnetic quality associated with golf balls 1406. Accordingly, golf balls 1406 are also required to possess that particular electronic, electromagnetic and/or magnetic quality, which a regular golf ball does not normally possess, to enable proximately located electronic ball-sensing systems 1404 to accurately detect the position of golf balls 1406. For example, golf balls 1406 may be required to include at least some magnetic material, electrically conductive material, a material substantially opaque to radar or other reflection-based locating signal, radio frequency identification (RFID) tags, near-field communication (NFC) tags or some other feature that allows electronic systems 1404 to sense the presence and/or proximity of golf balls 1406.

This one-to-one requirement for electronic ball-detection systems 1404 to service multiple targets 1402 and/or for specially designed golf balls 1406 can make arrangement 1400 prohibitively expensive to implement. Moreover, if a particular electronic system 1404 fails or falls out of calibration, or if a user drives regular golf balls in arrangement 1400 without understanding the above-described requirements, the driving range is effectively rendered inoperable for its intended purpose, at least with respect to the failed ball-detection system 1404 and/or the regular golf balls.

The present disclosure overcomes these inconveniences and limitations at least in part by utilizing one or more unmanned aerial vehicles (UAVs) to determine a location and/or distance of any sport object, for example, a regular golf ball, with respect to one or more reference points, as will be described in more detail below.

Figure 15:
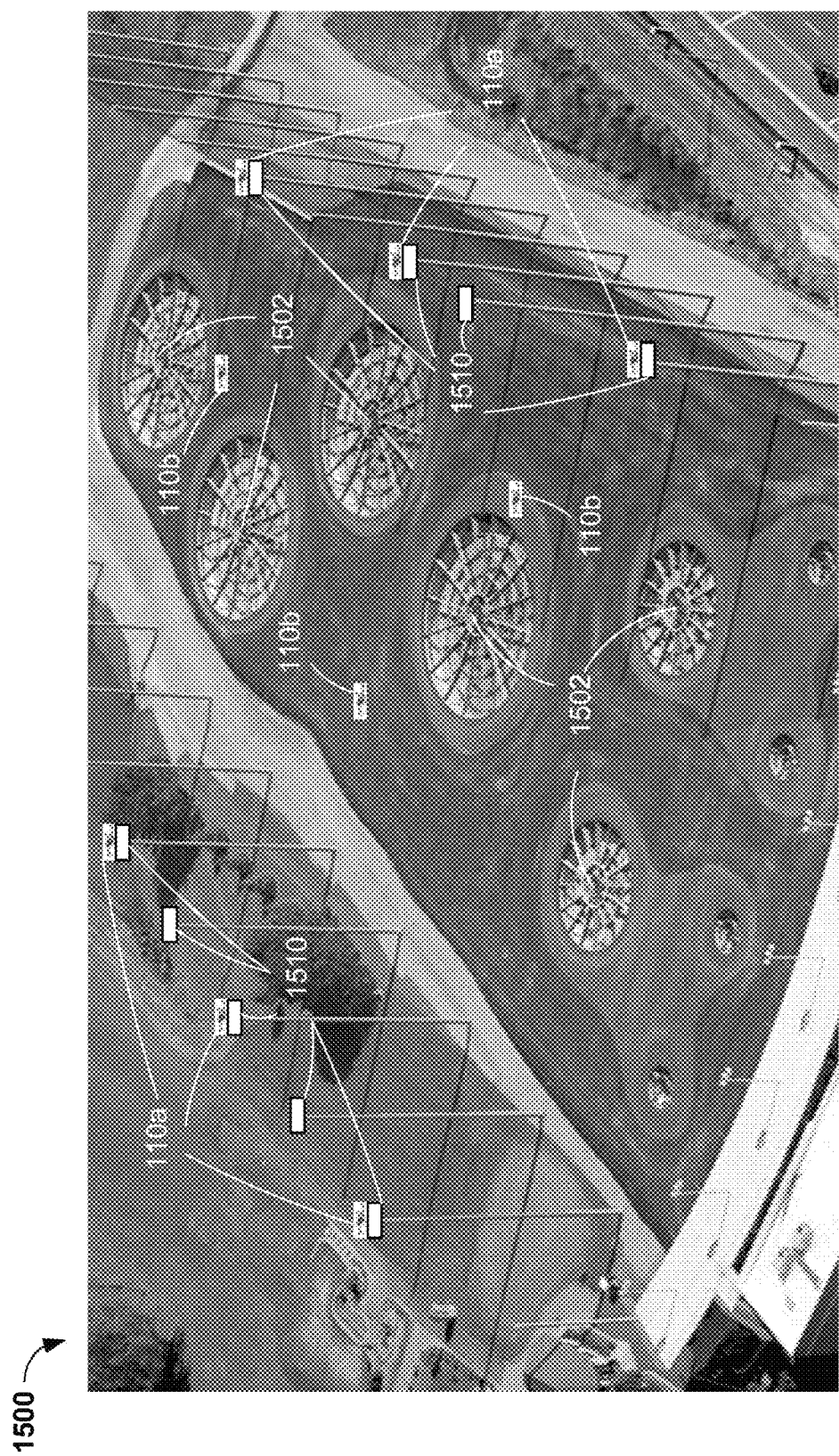
FIG. 15 illustrates an aerial view of a driving range utilizing a plurality of unmanned aerial vehicles (UAVs) in a system for determining, identifying and/or sensing a location and/or distance of a golf ball with respect to one or more reference points, according to some embodiments.

FIG. 15 illustrates an aerial view of a driving range utilizing a plurality of drones 110a, 110b in a system 1500 for determining, identifying and/or sensing a location and/or distance of a golf ball with respect to one or more reference points, according to some embodiments. While several features of system 1500 are described below for ease of understanding, it should be understood that system 1500 may additionally include any aspect, feature and/or equipment described anywhere else in this disclosure.

System 1500 includes a plurality of targets 1502, which may be, for example, golf holes and/or distance targets of a golf course and/or driving range. System 1500 further includes a plurality of charging stations 1510 disposed at varied locations along, on or outside a designated playing area of such a golf course and/or driving range. System further includes a plurality of UAVs 110a, 110b, one or more being a currently inactive UAV 110a and parked and/or otherwise disposed on a charging station 1510, and one or more being a currently active UAV 110b flying on one or more suitable flight plans and/or hovering at one or more suitable locations for determining, identifying and/or sensing a location and/or distance of a golf ball with respect to one or more reference points, as described anywhere in this disclosure.

As illustrated, while active, one or more of UAVs 110b may service one or more designated targets 1502 as described anywhere in this disclosure. While inactive, one or more UAVs 110a are being charged on a respective charging station 1510 and/or being serviced in some other way. When a suitable condition occurs, one or more inactive UAVs 110a may activate and fly to a suitable location to relieve and/or take over the function(s) and/or responsibilities of one or more other currently active UAVs 110b. In some embodiments, a currently active UAV 110b may terminate performing its current function(s) and/or responsibilities immediately upon sensing such a suitable condition, or after a predetermined or otherwise calculated delay of sensing such a suitable condition, with or without notification that another UAV is available to take over. Examples of such a suitable condition include but are not limited to one or more of inactive UAVs 110a becoming sufficiently charged, one or more inactive UAVs 110a having been serviced and now being operational or capable of proper operation, one or more active UAVs 110b sensing a battery charge has fallen below a threshold, one or more active UAVs 110b sensing an operating error, or one or more active or inactive UAVs 110a, 110b receiving a command to terminate, initiate or exchange responsibilities based on any factor, including but not limited to human control, a time of day, a number of golf balls detected in a session by a particular UAV or by system 1500 as a whole, or a user initiating, terminating or pausing a particular sporting session.

Methods

Figure 13:
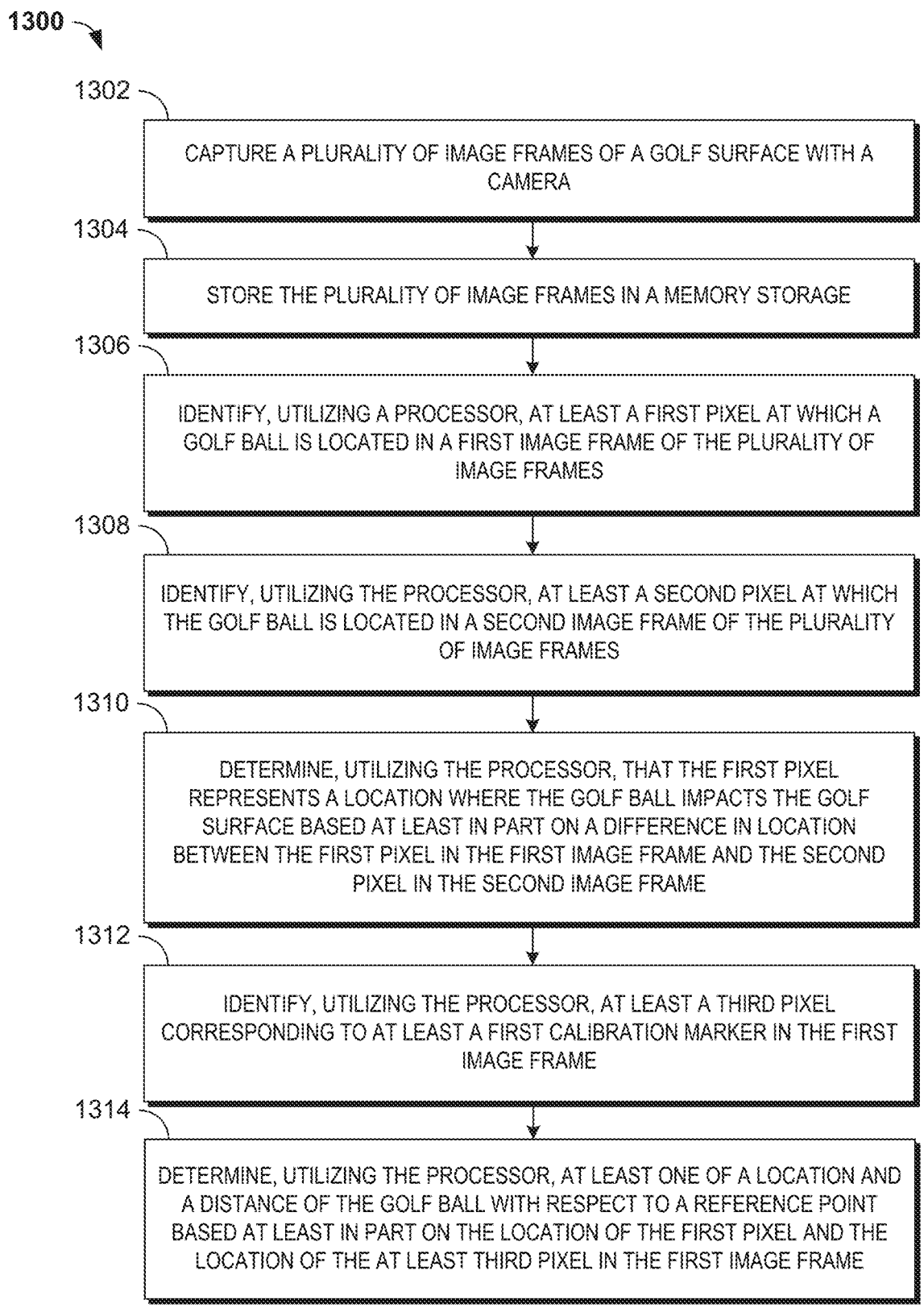
FIG. 13 illustrates a flowchart related to a method for tracking a golf ball with respect to a reference point, according to some embodiments.

FIG. 13 illustrates a flowchart 1300 related to a method for determining, identifying and/or sensing a location and/or distance of a golf ball with respect to a reference point, according to some embodiments. Although particular steps, actions or blocks are described below. The present disclosure is not so limited and one or more additional or alternative steps, actions or blocks may also be utilized, one or more steps, actions or blocks may be omitted, or a different ordering may be utilized without departing from the scope of the disclosure.

Flowchart 1300 may correspond to operations of any one or more of UAV 110, UAV controller 130, computing device 150, user terminal 160, and/or specifically to operations of any one or more of the processor(s), memories, input/output peripherals, and/or transceivers of those devices, alone or in combination.

Flowchart 1300 includes block 1302, which includes capturing a plurality of image frames of a golf surface with a camera. For example, as previously described, UAV 110 comprises camera 116, which is configured to capture a plurality of image frames (e.g., 402, 404, 406 of FIGS. 4A-4C) of a golf surface.

Flowchart 1300 proceeds to block 1304, which includes storing the plurality of image frames in a memory storage. For example, as previously described, image frames can be stored in any of memories 114, 124, 134, 144, 154 or 164 of UAV 110, UAV camera controller 120, UAV controller 130, video streamer 140, and/or user terminal(s) 160, respectively (see FIGS. 1 and 2).

Flowchart 1300 proceeds to block 1306, which includes identifying, utilizing a processor, at least a first pixel at which a golf ball is located in a first image frame of the plurality of image frames. For example, as previously described, any of processors 112, 132, 152 and 162 of UAV 110, UAV controller 130, computing device 150 and user terminal(s) 160, respectively, can identify at least a first pixel (e.g., corresponding to golf ball 410) at which a golf ball is located in first image frame 402.

In some embodiments, identifying at least the first pixel at which the golf ball is located in first image frame 402 comprises obtaining a first subtraction mask 502 (see FIG. 5A) by subtracting corresponding pixels of first image frame 402 from corresponding pixels of second image frame 404. First subtraction mask 502 comprises a plurality of color channels, each color channel comprising pixel values indicating an amount of a respective color contained by each pixel in the first subtraction mask. The identifying at least the first pixel can further comprise obtaining a first multiplication mask 602 (see FIG. 6A) by, for each pixel in first subtraction mask 502, multiplying the amounts of each respective color indicated by each color channel, and selecting the first pixel in first image frame 402 as corresponding to the pixel having one of the highest value and the lowest value in first multiplication mask 602.

Flowchart 1300 proceeds to block 1308, which includes identifying, utilizing the processor, at least a second pixel at which the golf ball is located in a second image frame of the plurality of image frames. For example, as previously described, any of processors 112, 132, 152 and 162 of UAV 110, UAV controller 130, computing device 150 and user terminal(s) 160, respectively, can identify at least a second pixel (e.g., corresponding to golf ball 410) at which a golf ball is located in second image frame 404.

In some embodiments, identifying at least the second pixel at which the golf ball is located in second image frame 404 comprises obtaining a second subtraction mask 504 (see FIG. 5B) by subtracting corresponding pixels of second image frame 404 from corresponding pixels of a third image frame 406. Second subtraction mask 504 comprises a plurality of color channels, each color channel comprising pixel values indicating an amount of a respective color contained by each pixel in the second subtraction mask. The identifying at least the second pixel can further comprise obtaining a second multiplication mask 604 (see FIG. 6B) by, for each pixel in second subtraction mask 504, multiplying the amounts of each respective color indicated by each color channel, and selecting the second pixel in second image frame 404 as corresponding to the pixel having one of the highest value and the lowest value in second multiplication mask 604.

Flowchart 1300 proceeds to block 1310, which includes determining, utilizing the processor, that the first pixel represents a location where the golf ball impacts the golf surface based at least in part on a difference in location between the first pixel in the first image frame and the second pixel in the second image frame. For example, as previously described, any of processors 112, 132, 152 and 162 of UAV 110, UAV controller 130, computing device 150 and user terminal(s) 160, respectively, can determine that the first pixel represents a location where golf ball 410 impacts the golf surface based at least in part on a difference in location between the first pixel in first image frame 402 and the second pixel in second image frame 404.

In some embodiments, the determining step of block 1310 comprises determining that a first difference in location between the first pixel in first image frame 402 and the second pixel in second image frame 404 is smaller than a second difference in location between a pixel at which the golf ball is located in an image frame of the plurality of image frames captured immediately prior to the first image frame and the first pixel in first image frame 402.

Flowchart 1300 proceeds to block 1312, which includes identifying, utilizing the processor, at least a third pixel corresponding to at least a first calibration marker in the first image frame. For example, as previously described, any of processors 112, 132, 152 and 162 of UAV 110, UAV controller 130, computing device 150 and user terminal(s) 160, respectively, can identify at least a third pixel corresponding to at least a first calibration marker (e.g., any of markers 802, 804, 806, 808 of FIG. 8) in first image frame 402.

Flowchart 1300 proceeds to block 1314, which includes determining, utilizing the processor, at least one of a location and a distance of the golf ball with respect to a reference point based at least in part on the location of the first pixel and the location of the at least third pixel in the first image frame. For example, as previously described, any of processors 112, 132, 152 and 162 of UAV 110, UAV controller 130, computing device 150 and user terminal(s) 160, respectively, can determine at least one of a location and a distance of golf ball 410 with respect to a reference point (e.g., any one of markers 802, 804, 806, 808 and golf hole 812) based at least in part on the location of the first pixel (e.g., corresponding to golf ball 410) and the location of the at least third pixel (e.g., corresponding to any of markers 802, 804, 806, 808 of FIG. 8) in first image frame 402.

In some embodiments, flowchart 1300 could further include streaming the plurality of image frames to one or more of a controller of the unmanned aerial vehicle and the computing device. For example, in some streaming embodiments as described above in connection with at least FIGS. 1 and 2, image data may be streamed from UAV 110 to, e.g., to UAV controller 130 and/or computing device 150 while UAV 110 is flying. Accordingly, processing of the image frames can take place by UAV controller 130 and/or computing device 150 in real-time or near real-time while UAV 110 is in flight, even in circumstances wherein UAV 110 is not configured or capable of processing the captured image frames in real-time or near real-time.

In some embodiments, flowchart 1300 could further include uploading the plurality of image frames to one or more of a controller of the unmanned aerial vehicle and the computing device after the unmanned aerial vehicle lands. For example, in some post-processing embodiments as described above in connection with at least FIGS. 1 and 2, image data may not be streamed from UAV 110 to another computing device while UAV 110 is flying and is, instead, uploaded to UAV controller 130 and/or computing device 150 upon UAV landing. Processing of the image frames can take place by UAV controller 130 and/or computing device 150 after UAV 110 lands, accordingly.

In some embodiments, flowchart 1300 could further include determining a region of interest, based at least in part on identifying the first pixel in first image frame 402, in which pixels of subsequent image frames (e.g., image frames 404, 406) of the plurality of image frames are analyzed for identifying a subsequent location of golf ball 410. For example, as previously described, narrowing analysis of image frames to only pixels in one or more regions of interest, which can include a predetermined portion of the image frames in which a golf ball is expected or highly likely to enter the image frames can reduce the computational load of analyzing image frames for the presence of golf balls.

In some embodiments, flowchart 1300 could further include determining a 3-dimensional location of camera 116 based at least in part on a distortion between an orientation of the respective pixels in the first image frame corresponding to each of the plurality of calibration markers and a known orientation of the plurality of calibration markers. For example, as previously described in connection with at least FIG. 8, a 3-dimensional location of camera 116 can be determined based at least in part on a distortion between an orientation of the respective pixels in first image frame 402 corresponding to each of calibration markers 802, 804, 806, 808 and a known orientation of those markers.

In some embodiments, flowchart 1300 could further include verifying an accuracy of the determined location or distance of the golf ball with respect to the reference point by determining a location of the auxiliary calibration marker and comparing the determined location of the auxiliary calibration marker with the predetermined location. For example, as previously described in connection with at least FIG. 8, an accuracy of the determined location or distance of golf ball 410 with respect to a reference point (e.g., any of markers 802, 804, 806, 808 and/or hole 812) can be verified by determining a location of the auxiliary calibration marker 812, and comparing the determined location of marker 812 with its predetermined location.

In some embodiments, flowchart 1300 could further include generating an inverse trajectory of the golf ball based at least in part on the first pixel at which the golf ball is located in the first image frame and the second pixel at which the golf ball is located in the second image frame. For example, as previously described in connection with at least FIG. 11, an inverse trajectory 1112, 1114, 1116 of any of golf balls 1102, 1104, 1106 can be generated based at least in part on the first pixel at which the golf ball is located in first image frame 402 (see FIG. 4) and the second pixel at which the golf ball is located in second image frame 404 (see FIG. 4).

In some embodiments, flowchart 1300 could further include determining which of a plurality of golfers hit the golf ball based at least in part on the generated inverse trajectory of the golf ball and at least one of accelerometer data and global positioning method data corresponding to at least one of the plurality of golfers. For example, as previously described in connection with at least FIG. 12, a golfer (e.g., one of golfers 1202, 1204 of FIG. 12) that hit the golf ball can be identified based at least in part on the generated inverse trajectory of the golf ball and at least one of accelerometer data and global positioning method data corresponding to at least one of the golfers 1202, 1204.

GENERAL INTERPRETIVE PRINCIPLES FOR THE PRESENT DISCLOSURE

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A golf ball tracking system, comprising:
a camera configured to capture a plurality of image frames of a golf surface;
a memory configured to store the plurality of image frames;
a processor configured to:
identify at least a first pixel at which a golf ball is located in the first image frame of the plurality of image frames;
identify at least a second pixel at which the golf ball is located in a second image frame of the plurality of images frames;
determine that the first pixel represents a location where the golf ball impacts the golf surface based at least in part on (1) determining a difference in location between the first pixel in the first image frame and the second pixel in the second image frame, and (2) determining that a first difference in location between the first pixel in the first image and the second pixel in the second image frame is smaller than a second difference in location between a pixel at which the golf ball is located in an image frame of the plurality of image frames captured immediately prior to the first image frame and the first pixel in the first image frame.

2. The system of claim 1, wherein the camera is mounted to an unmanned aerial vehicle.

3. The system of claim 1, wherein the memory is disposed within an unmanned aerial vehicle.

4. The system of claim 3, wherein the processor is disposed within the unmanned aerial vehicle.

5. The system of claim 3, wherein the processor is disposed within a computing device other than the unmanned aerial vehicle.

6. The system of claim 5, wherein the unmanned aerial vehicle further comprises a transceiver configured to stream the plurality of image frames to one or more of a controller of the unmanned aerial vehicle and the computing device.

7. The system of claim 5, wherein the unmanned aerial vehicle is configured to upload the plurality of image frames to one or more of a controller of the unmanned aerial vehicle and the computing device after the unmanned aerial vehicle lands.

8. The system of claim 1, wherein the processor is configured to identify at least the first pixel at which the golf ball is located in the first image frame of the plurality of image frames by:
obtaining a first subtraction mask by subtracting corresponding pixels of the first image frame from corresponding pixels of the second image frame, the first subtraction mask comprising a plurality of first color channels, each first color channel comprising pixel values indicating an amount of a respective color contained by each pixel in the first subtraction mask;
obtaining a first multiplication mask by, for each pixel in the first subtraction mask, multiplying the amounts of each respective color indicated by each first color channel; and
selecting the first pixel in the first image frame as corresponding to the pixel having one of the highest value and the lowest value in the first multiplication mask.

9. The system of claim 1, wherein the processor is configured to identify at least the second pixel at which the golf ball is located in the second image frame of the plurality of image frames by:
obtaining a second subtraction mask by subtracting corresponding pixels of the second image frame from corresponding pixels of a third image frame of the plurality of image frames, the second subtraction mask comprising a plurality of second color channels, each second color channel comprising pixel values indicating an amount of a respective color contained by each pixel in the second subtraction mask;
obtaining a second multiplication mask by, for each pixel in the second subtraction mask, multiplying the amounts of each respective color indicated by each second color channel; and
selecting the second pixel in the second image frame as corresponding to the pixel having one of the highest value and the lowest value in the second multiplication mask.

10. The system of claim 1, wherein the processor is configured to determine a region of interest, based at least in part on identifying the first pixel in the first image frame, in which pixels of subsequent image frames of the plurality of image frames are analyzed for identifying a subsequent location of the golf ball.

11. The system of claim 10, wherein the processor identifies the second pixel in the second image frame based on analyzing the pixels within the region of interest in the second image frame.

12. The system of claim 1, wherein the processor is configured to:
identify at least a third pixel corresponding to at least a first calibration marker in the first image frame;
determine at least one of a location and a distance of the golf ball with respect to a reference point based at least in part on the location of the first pixel and the location of the at least third pixel in the first image frame; and
wherein the at least a first calibration marker comprises a plurality of calibration markers and the processor is configured to determine respective pixels in the first image frame corresponding to each of the plurality of calibration markers, each calibration marker disposed a first predetermined distance from the reference point and a second predetermined distance from at least one other of the plurality of calibration markers.

13. The system of claim 12, wherein the reference point is a golf hole.

14. The system of claim 12, wherein the processor is configured to determine a 3-dimensional location of the camera based at least in part on a distortion between an orientation of the respective pixels in the first image frame corresponding to each of the plurality of calibration markers and a known orientation of the plurality of calibration markers.

15. The system of claim 14, wherein the processor is configured to determine the at least one of the location and the distance of the golf ball with respect to the reference point based at least in part on the location of the first pixel and the 3-dimensional location of the camera.

16. The system of claim 12, wherein the plurality of calibrated markers comprises an auxiliary calibration marker disposed at a predetermined location with respect to at least one of the other plurality of calibration markers, the processor configured to verify an accuracy of the determined location or distance of the golf ball with respect to the reference point by:
 determining a location of the auxiliary calibration marker; and
 comparing the determined location of the auxiliary calibration marker with the predetermined location.

17. The system of claim 1, wherein the processor is configured to generate an inverse trajectory of the golf ball based at least in part on the first pixel at which the golf ball is located in the first image frame and the second pixel at which the golf ball is located in the second image frame.

18. The system of claim 17, wherein the processor is configured to determine which of a plurality of golfers hit the golf ball based at least in part on the generated inverse trajectory of the golf ball and at least one of accelerometer data and global positioning system data corresponding to at least one of the plurality of golfers.

* * * * *